United States Patent [19]
Kilmer et al.

[11] 3,804,528
[45] Apr. 16, 1974

[54] PRINT PROJECTOR FOR FITTING CONTACT LENSES

[76] Inventors: Lauren G. Kilmer; McCabe C. Lively, both of c/o Gemco Manufacturing Co., 1826 N. Kingston Pl., Tulsa, Okla. 74115; Alvin E. Reynolds, c/o International Diagnostic Instruments Limited, 3540 E. 31st St., Tulsa, Okla. 74135

[22] Filed: June 5, 1972

[21] Appl. No.: 259,611

[52] U.S. Cl.................. 356/165, 356/168, 351/7, 353/63, 353/65
[51] Int. Cl. ............................................... G01b 9/08
[58] Field of Search .......... 356/165, 164, 168, 169, 356/71; 351/7; 353/63, 65

[56] References Cited
UNITED STATES PATENTS

| | | | |
|---|---|---|---|
| 3,264,932 | 8/1966 | Hendricks | 356/165 |
| 2,273,936 | 2/1942 | Ceroni | 353/63 |
| 1,711,909 | 5/1929 | Stalcup | 353/65 |
| 3,598,478 | 8/1971 | Townsley | 351/7 |

Primary Examiner—Ronald L. Wibert
Assistant Examiner—Paul K. Godwin
Attorney, Agent, or Firm—Morton, Bernard, Brown, Roberts & Sutherland

[57] ABSTRACT

Apparatus for use in the fitting of contact lenses. A positive print of a photograph of the eye of a patient is obtained having superimposed thereon a plurality of concentric circles with diameters having a known relationship to the photograph size. This positive print is placed in the viewer of the present invention and an image of it is projected onto a viewing screen having a plurality of concentric circles thereon. The magnification of the image is adjusted to cause desired relationships between the circles of the screen and the circles of the picture, and an indicator on the viewer shows the base curve and optical zone for contact lenses.

13 Claims, 10 Drawing Figures

PRINT PROJECTOR FOR FITTING CONTACT LENSES

The present invention pertains to an optical instrument. More particularly, the present invention pertains to apparatus for fitting of contact lenses to the eye of a person.

Many people require corrective lenses to permit them to see properly. A large number of these people wear eye glasses of the type in which lenses are mounted within a frame supported by the nose and ears of the wearer. Numerous other people who require corrective lenses, however, prefer to wear contact lenses which fit on top of the cornea and beneath the eyelid of each eye. These contact lenses must be fitted with extreme accuracy to avoid causing great discomfort to the wearer. Each cornea has a substantially spherical surface of a unique radius. If contact lenses are to be worn for a long period of time, each lens must fit accurately and must not interfere with the exchange of precorneal fluid over the cornea; otherwise the lenses soon cause discomfort and inflamation, preventing the wearer from seeing and, in extreme cases, damaging the eyes.

There recently have been developed photographic techniques for determining the radius of curvature of the corneas of a person being fitted for contact lenses. Typical of these is a device in which light is projected through a screen to the eyes of the patient from which the light is reflected. The screen through which the light passes includes translucent rings of various diameters and various widths. The patient is instructed to look at a black dot while the apparatus is adjusted. A picture is then made showing the patient's eye with lighted rings reflected thereon. The negative film of this picture is placed in a projector to cause an enlargement of the picture to appear on a projection screen having a number of circular rings on it. A comparison of the rings on the projection screen with the rings projected from the negative is utilized to determine the curvature required for the contact lenses.

Many drawbacks exist with this apparatus. The black dot on which the patient is asked to focus is in an indistinctly lighted area and is generally so close to the patient's eye that he has difficultly focusing on it. The camera, by means of which the picture is taken, is raised and lowered on a screw mounted stand and is moved horizontally by hand. The camera is operated by hand. The operations cause unsteadiness and often result in unsatisfactory pictures. The projector for the negative film includes essentially a point source of light which is moved toward and away from the film to provide the necessary enlargement. This effort must be done in a dark room because of the low light level in the apparatus. The projector and camera are not standardized and so they cannot be interchanged with other projector and camera devices. Therefore, the calibration of a particular projector with a particular camera must be determined before the two components can be used together. Similar shortcomings exist in other equipment presently available for the fitting of contact lenses.

The present invention is apparatus for fitting of contact lenses and overcoming these several shortcomings. In accordance with the present invention, positive prints of photographs are obtained of a patient's eye having superimposed on the cornea a plurality of concentric circles of related diameters. Preferably one of the circles is of a diameter equal to the cornea radius. These positive prints or pictures are placed one at a time within an instrument which projects a magnified view of the picture onto viewing screen having on it a plurality of concentric circles of known diameters. The doctor adjusts controls on this instrument to correlate circles on the picture and the circles on the screen. When this is achieved, the doctor reads from an indicating device on the instrument measurements permitting him to determine the requirements for a properly fitting, comfortable contact lens.

The present invention thus operates in a manner similar to an opaque projector, utilizing reflected light to generate on a translucent screen an image from a positive print. The pictures, of course, must be obtained by means of a camera which is equipped to cause images of concentric circles to appear on the patient's cornea and which is correlated to the viewer instrument of the present invention. A preferred camera for this purpose is shown in copending U.S. Patent application Ser. No. 259,660 filed of even date herewith by Lauren G. Kilmer. Other cameras could be used so long as the circles formed on the positive print are correlated with the concentric circles on the viewer instrument of the present invention.

These and other aspects and advantages of the present invention are more apparent in the following detailed description and claims, particularly when considered in conjunction with the accompanying drawings in which like parts bear like reference numerals. In the drawings:

Figure 1:
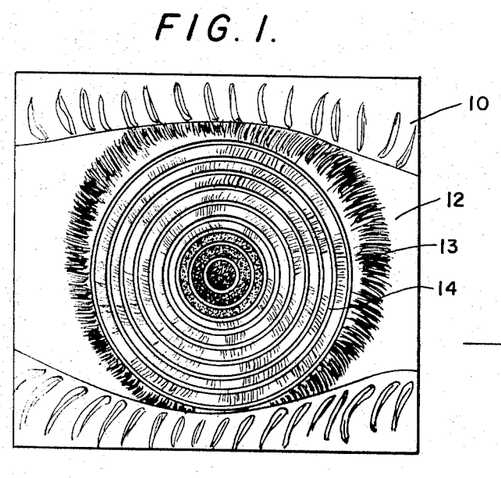
FIG. 1 depicts a positive print of a picture of an eye suitable for use in conjunction with an instrument in the fitting of contact lenses in accordance with the present invention.

FIG. 1 depicts a positive print of a picture 10 showing an eye 12 having a plurality of concentric circles 14 superimposed on the cornea 13 thereof. Picture 10 is made by means of a camera including means for projecting onto the cornea 13 concentric circles of light with a known projection diameter and including means for making picture 10 with a known size relationship to the patient's eye. Preferably the camera is constructed so that the diameter of the outermost circle 14 on cornea 13 is equal to the cornea radius. This can be achieved by generating the circles 14 from the light passing through circular openings in a hemispherical shell with cornea 13 at substantailly the center of curvature of that shell and with the camera focused on that center of curvature. A suitable camera is shown in co-pending U.S. Patent application Ser. No. 259,660 filed of even date herewith.

Only one properly located circle 14 is required on the print 10 of the patient's eye to permit determination of the cornea radius. In practice, however, a plurality of concentric circles 14 are frequently preferred since they make more apparent in the print the extent to which the cornea surface varies from spherical. The present invention is described with reference to a plurality of concentric circles; however, in accordance with the present invention a print having but one properly positioned circle would be satisfactory. In addition, in describing the present invention, the outermost concentric circle is described as the circle of interest insofar as determining the radius of curvature of the cornea, but any one of the circles could be utilized so long as it has a diameter equal to the radius of curvature of the cornea.

Figure 2:
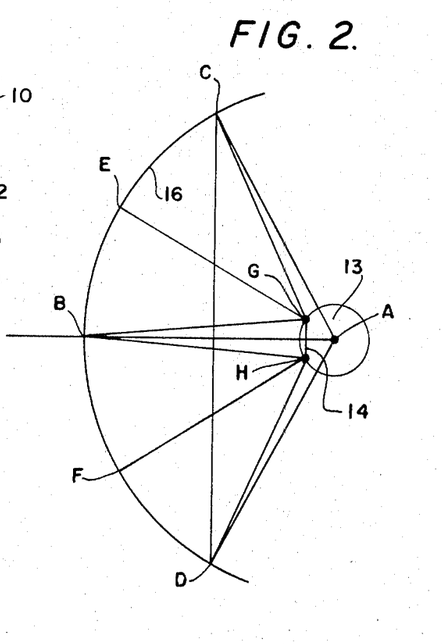
FIG. 2 illustrates geometrically a preferred manner of generating positive prints such as that depicited in FIG. 1.

FIG. 2 geometrically illustrates that light passing through an appropriate circular opening in a hemispherical shell onto a cornea located at substantially the center of curvature of that shell will cause to appear on a photograph of the cornea, taken by a camera focused on that center of curvature, a circle having a diameter equal to the cornea radius. Curve 16 represents an arc on the inner surface of the hemispherical shell. The shell, and thus curve 16, are centered about point A. An opening is provided through the shell at point B through which the camera focuses on point A. The shell is opaque except for one or more transparent concentric circles through which light from behind the shell passes to reach point A. The outermost circle intersects curve 16 at points C and D, and so line CD is a diameter of that circle and is perpendicular to line AB. The outermost ring is positioned so that angle CAD, the angle subtended at point A by diameter CD, equals 120°, with angle CAB and angle BAD each equaling 60°. The cornea of the patient's eye is substantially spherical. When the camera is properly focused on the patient's eye, the patient is positioned so that his cornea 13 is centered about point A. Line AE bisects angle CAB, and line AF bisects angle BAD. Light passing through the outermost ring at point C is reflected from cornea 13 at point G, and since the angle of reflection equals the angle of incidence, this reflected light is directed to point B, the opening in the shell through which the camera focuses onto point A. Likewise, light from the outermost ring at point D is reflected from cornea 13 at point H to point B. Thus, as seen by the camera, the outermost concentric circle 14 on cornea 13 passes through points G and H. Angle EAB equals 30°, and angle BAF equals 30°, therefore, angle EAF equals 60°. Line GH, the diameter of outermost circle 14, is perpendicular to line AB, and angle EAB equals 30°; therefore, angle AGH equals 60°. Likewise, angle AHG equals 60°, and so triangle AGH is an equilateral triangle. Thus GH, the diameter of the outermost circle 14, as seen by the camera, is equal to AG, the cornea radius. Consequently, determination from print 10 of the diameter of the outermost circle 14 results in determination of the cornea radius.

Figure 3:
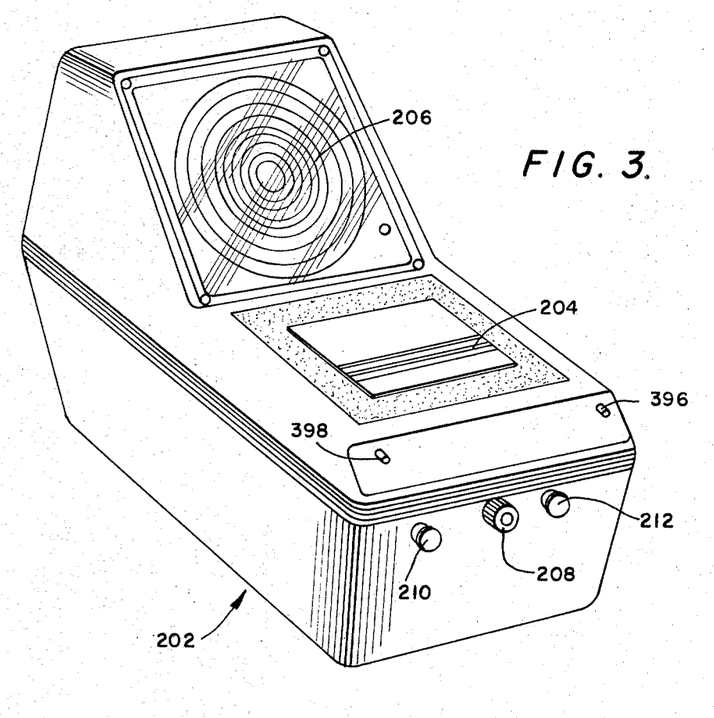
FIG. 3 is a perspective view of a viewer instrument for use in conjunction with positive prints of the type depicted in FIG. 1 in the fitting of contact lenses in accordance with the present invention.

Once photographs of the patient's eyes, such as picture 10, have been obtained, the doctor or other operator places them one at a time into the viewer 202 depicted in FIG. 3. Viewer 202 includes removable cover 204 on its upper surface which, when lifted, exposes a slot for receiving a picture. Viewer 202 operates similar to an opaque projector to project an image of picture 10 onto viewing screen 206 which has a number of concentric circles on it equal to the number of circles 14 on cornea 13. Viewer 202 includes controls 208, 210 and 212, permitting adjustment of the magnification, vertical alignment, and horizontal alignment, respectively, of the image on viewing screen 206.

Figure 4:
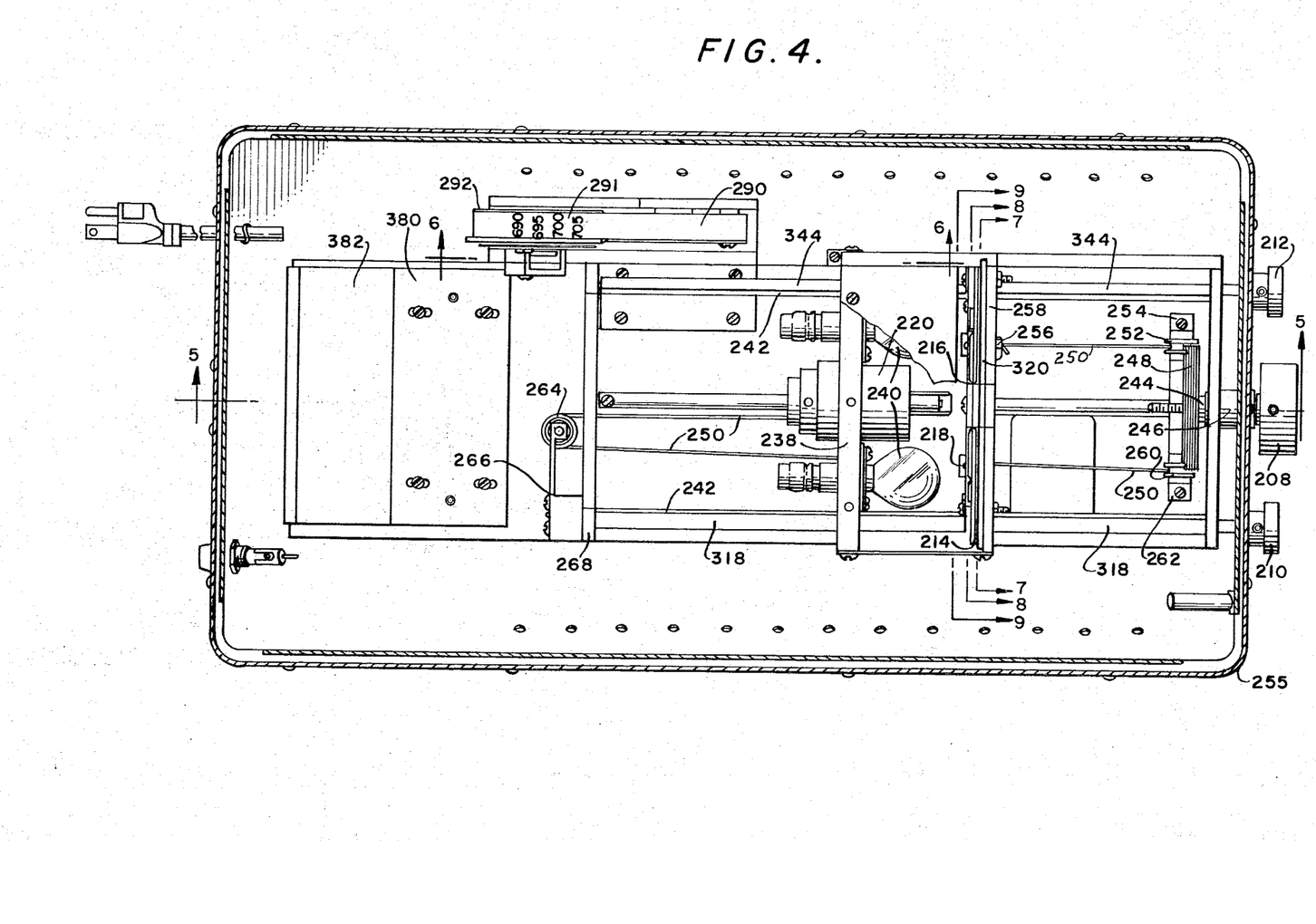
FIG. 4 is a top plan view of the viewer of FIG. 3, with the cover removed.
Figure 5:
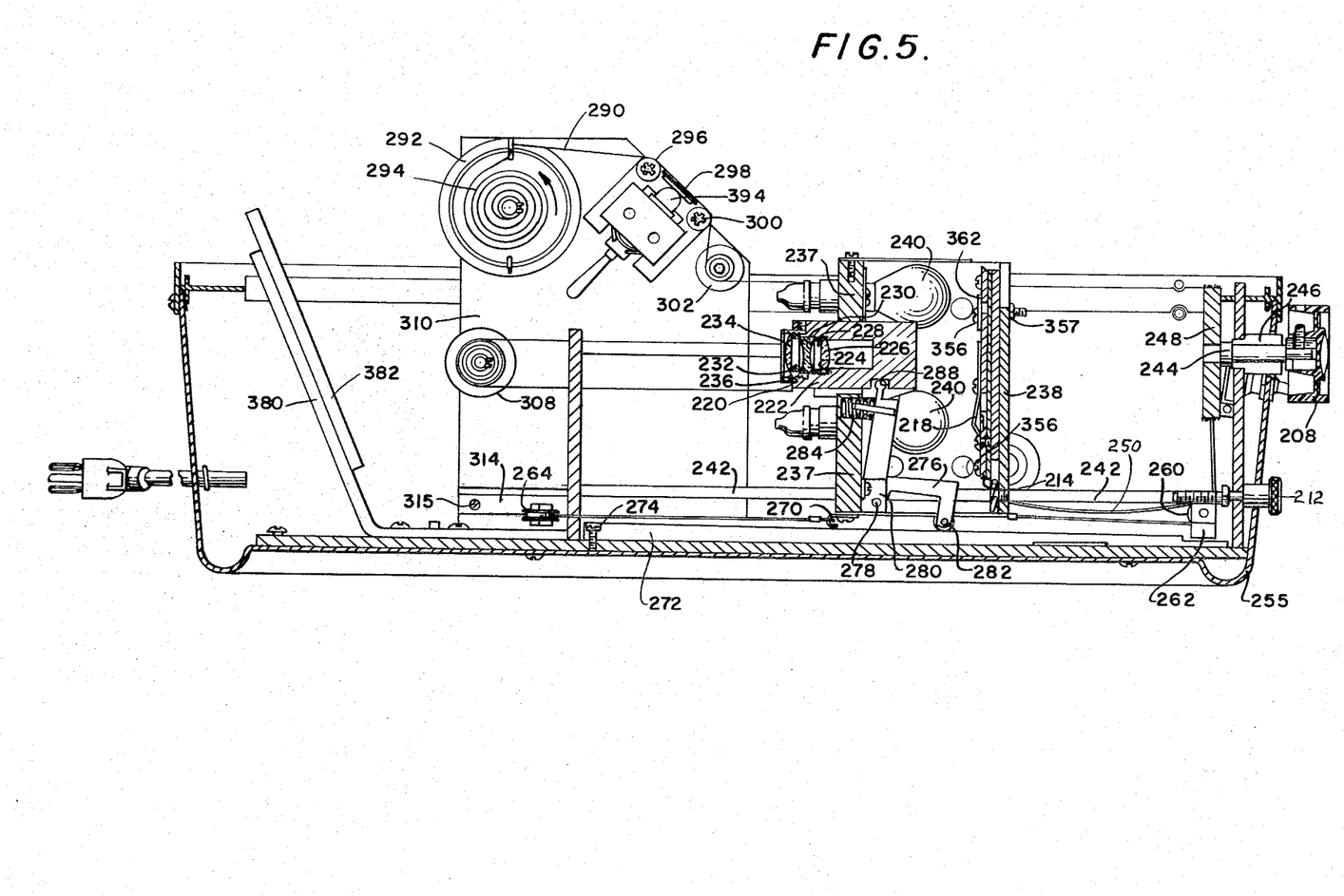
FIG. 5 is a sectional view taken along line 5—5 of FIG. 4.

FIGS. 4 and 5 depict the interior of viewer 202. Picture 10 of a patient's eye is inserted into picture holder assembly 214 and is held in place by means of pressure pad 216 onto which pressure is applied by springs 218.

Lens assembly 220 includes frame 222 having a shoulder 224 at the forward end thereof. First lens 226 is held against shoulder 224 by spacer 228. Second lens 230 is held against spacer 228 by means of second spacer 232. Third lens 234 is held against spacer 232 by retainer 236 which is threaded into the rearward end of lens assembly frame 222. Lens assembly 220 is connected to plate 237 on carriage 238 within viewer 202. Plate 237 also supports lights 240 which projects light onto the picture within picture holder assembly 214.

Picture holder assembly 214 and lens assembly 220 are mounted on carriage 238 which is supported within viewer 202 by slide bars 242. Control knob 208 controls the longitudinal position of carriage 238 within viewer 202. Knob 208 is connected to sheave 248 by shaft 244 which passes through bushing 246. Cable 250 is wound about sheave 248. From one side of sheave 248, cable 250 passes downward to pulley 252 which is fastened by bracket 254 in the lower portion of the housing 255 of viewer 202. From pulley 252 cable 250 passes to connector 256 which is fastened to front plate 258 of carriage 238.

From the other side of sheave 248, cable 150 of carriage 238 passes downward to pulley 260 which is fastened by bracket 262 in the lower portion of the housing 255 of viewer 202. From pulley 260 cable 250 passes to pulley 264 which is connected by bracket 266 to housing frame member 268. cable 250 loops about pulley 264 and is attached to carriage 238 by connector 270. Thus, as control knob 208 is rotated, cable 250 is taken up on one side of sheave 248 and is simultaneously paid out from the other side of the other side of the sheave to move carriage 238 longitudinally within housing 255 of viewer 202.

Camming member 272 is connected by bolts 274 to the lower surface of housing 255 in viewer 202. The upper surface of camming member 272 is inclined, being higher toward the rear of viewer 202. Focusing lever 276 is pivotally connected by pin 278 to bracket 280 on carriage 238. Roller 282 is connected to one end of focusing lever 276 and rides upon the upper surface of camming member 272 as carriage 238 moves longitudinally within housing 255 of viewer 202. Spring 284 fits within recess 285 of plate 237 and acts against plate 237 and the second end of lever 276, urging the lever toward the front viewer 202. The second end of lever 276 fits within opening 288 in lens assembly 220. Accordingly, as carriage 238 moves longitudinally toward the rear of housing 255, moving with it picture 10 within picture holder assembly 214, camming member 272 raises the first end of focusing lever 276, and the second end of lever 276 moves lens assembly 220 slightly away from the picture within picture holder assembly 214 against the urging of spring 284, thereby maintaining the proper focus of the image of picture 10 formed on viewing screen 206.

Figure 6:
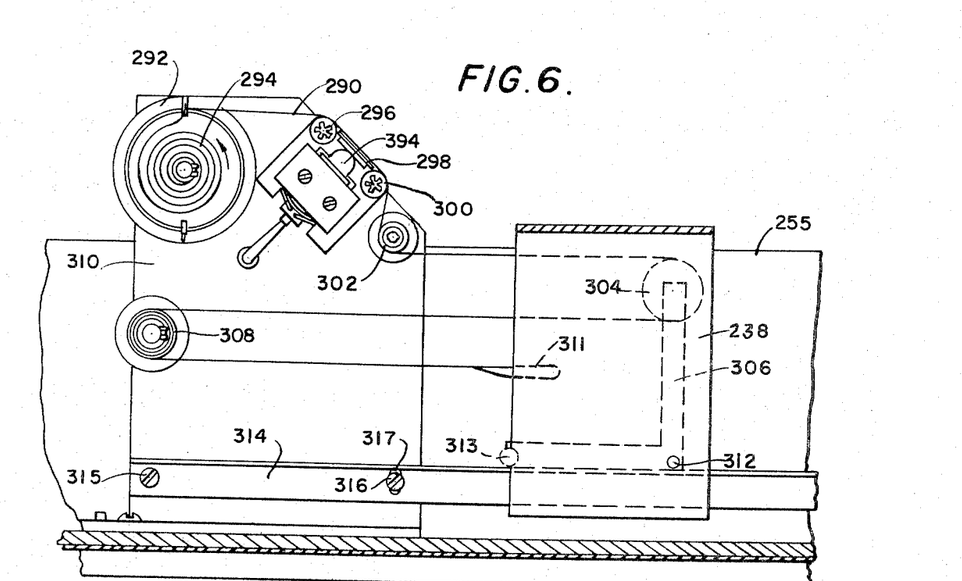
FIG. 6 is a fragmentary sectional view taken along line 6—6 of FIG. 4.

The base curve and optical zone for the contact lens are indicated by the longitudinal position of carriage 238 within viewer 202 at the time the image of picture 10 is at the proper magnifications on viewer screen 206. FIG. 6 depicts a manner of indicating these parameters. The longitudinal position of carriage 238 is utilized to control movement of tape 290 which has numerical indica 291 thereon, indicative of the required parameter valves. Tape 290 is wound on reel 292 which is rotatably mounted on support 310 and is biased by spring 294 to cause reel 292 to rotate so as to draw the tape onto the reel. From reel 292, tape 290 passes over guide wheel 296, across viewing aperture 298, and over guide wheel 300 to flange guide roller 302. From there, the tape feeds about guide wheel 304, which is mounted on one end of bell crank 306, to guide wheel 308, which is rotatably mounted on support 310 substantially beneath reel 292. From wheel 308, the tape passes to block 311 which is fastened to carriage 238. Bell crank 306 is pivotally mounted on carriage 238 by pin 312. Roller 313 is mounted on the second end of bell crank 306. Angle member 314 has its first end secured to support 310 by means of bolt 315 which is fastened substantially beneath reel 292. Bolt 316 passes through vertically elongated slot 317 in angle member 314 to fasten angle member 314 at the forward end of support member 310. Thus, the inclination of angle member 314 can be altered by loosening bolt 316 and pivoting angle member 314 about bolt 315.

As carriage 238 moves longitudinally within housing 255 of viewer 202, tape 290 is drawn from or taken up by reel 292. The indicium 291 adjacent viewing aperture 298 indicates the longitudinal position of carriage 238 within housing 255 of viewer 202. The three passes of tape 290 between support 310 and carriage 238, which result from passage of tape 290 from wheel 302 about wheels 304 and 308 and back to block 311, cause the tape to move longitudinally a length equal to about three times the distance which carriage 238 moves. This increases the degree of accuracy with which the measurements can be read.

Viewer 202 must be calibrated with a standard sphere of known diameter. Thus, for example, a photograph of a sphere of known diameter having circles 14 thereon is placed in picture holder assembly 214, and carriage 238 is then moved known distances to cause the diameter of the sphere image to be a given size on viewing screen 206, and the indicia 291 adjacent viewer aperture 298 are monitored. Minor adjustments in the calibration can be made by adjusting the inclination of angle member 314 which determines the precise amount of tape 290 passing viewing aperture 298 as a result of movement of carriage 238.

Tape 290 can be an opaque tape, with the numerical indicia 291 being transparent. The indicia 291 might range from 635 to 960, correspondingly respectively with 6.35 millimeters and 9.60 millimeters.

Figure 7:
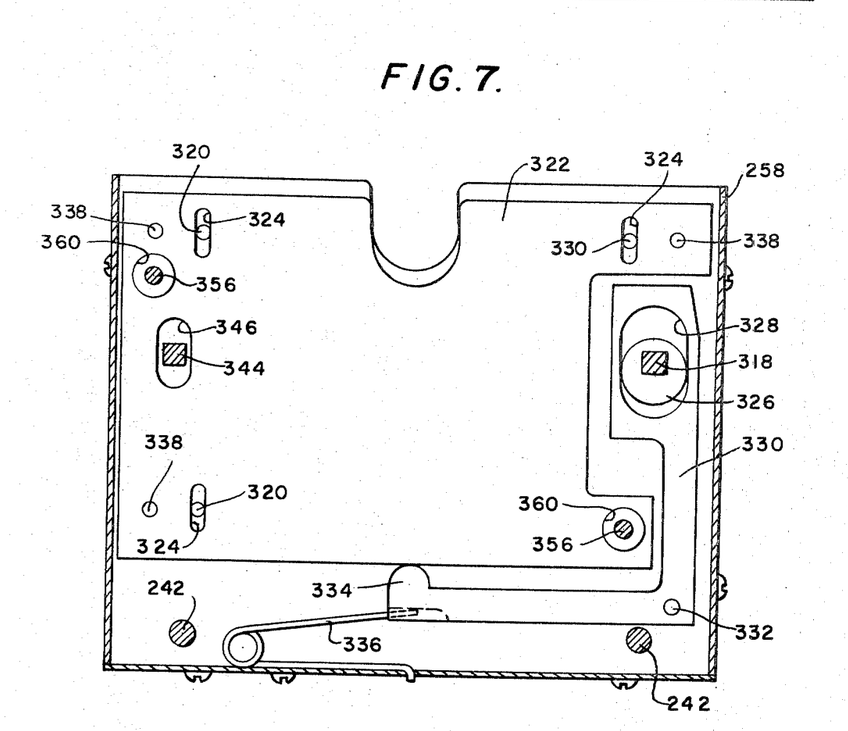
FIG. 7 is a sectional view taken along line 7—7 of FIG. 4.

Control knobs 210 and 212 permit vertical and horizontal adjustment of the image formed on screen 206 of picture 10 within picture holder assembly 214. Control knob 210 is connected to control rod 318 which extends from the front of viewer 202, through carriage 238, to viewer end member 268 in which it is supported. The vertical adjustment mechanism is depicted in FIG. 7. Pins 320 are press fitted into front plate 258 of carriage 238. Vertical adjustment plate 322 includes vertically elongated openings 324 through which pins 320 pass. Thus, vertical adjustment plate 322 is able to move vertically with respect to front plate 258. Cam 326 is slidingly mounted on rod 318 and fits within vertically elongated opening 328 in the first end of lever 330. Lever 330 pivots about pin 332 which is press fitted into front plate 258. Thus, as control knob 210 is rotated to rotate rod 318, cam 328 causes lever 330 to pivot about pin 332. The second end of lever 330 includes projection 334 and is urged upwardly against the lower surface of vertical adjustment plate 322 by action of cam 326. Spring 336 provides upward bias partially countering the weight of plate 322. Consequently, rotation of knob 210 causes lever 330 to control the vertical position of vertical adjustment plate 322.

Figure 8:
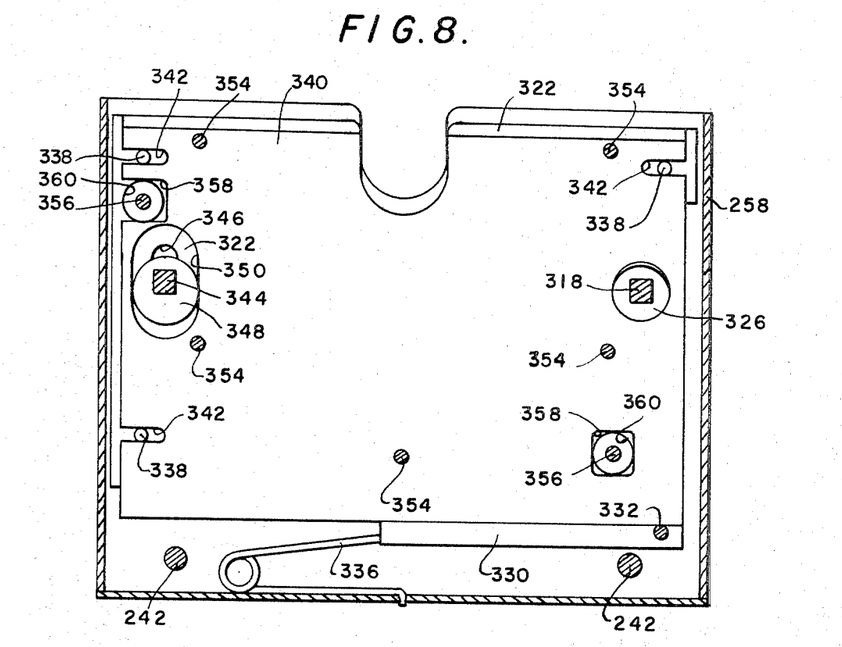
FIG. 8 is a sectional view taken along line 8—8 of FIG. 4.

Pins 338 are press fitted into vertical adjustment plate 322. Horizontal adjustment plate 340 of picture holder assembly 214 is depicted in FIG. 8 and includes horizontally elongated slots 342 through which pins 338 pass. Thus, as vertical adjustment plate 322 moves vertically, horizontal adjustment plate 340 also moves vertically, but horizontal adjustment plate 340 is able to move horizontally independent of vertical adjustment plate 322. Control knob 212 is connected to control rod 344 which, like control rod 318, extends from the front of viewer 202, through carriage 238 to viewer end member 268 in which it is supported. Rod 344 passes through opening 346 of vertical adjustment plate 322 and through a similar opening in front plate 258 so that rod 344 can be rotated without contact with plate 258 or plate 322. Cam 348 is slidingly mounted on rod 344 and fits within vertically elongated openings 350 of horizontal adjustment plate 340 so that, on rotation of control knob 212, cam 348 causes horizontal adjustment plate 340 to move horizontally. Horizontal adjustment plate 340 thus moves vertically with vertical adjustment plate 322 under the control of knob 210 and moves independently horizontally under the control of knob 212.

Figure 9:
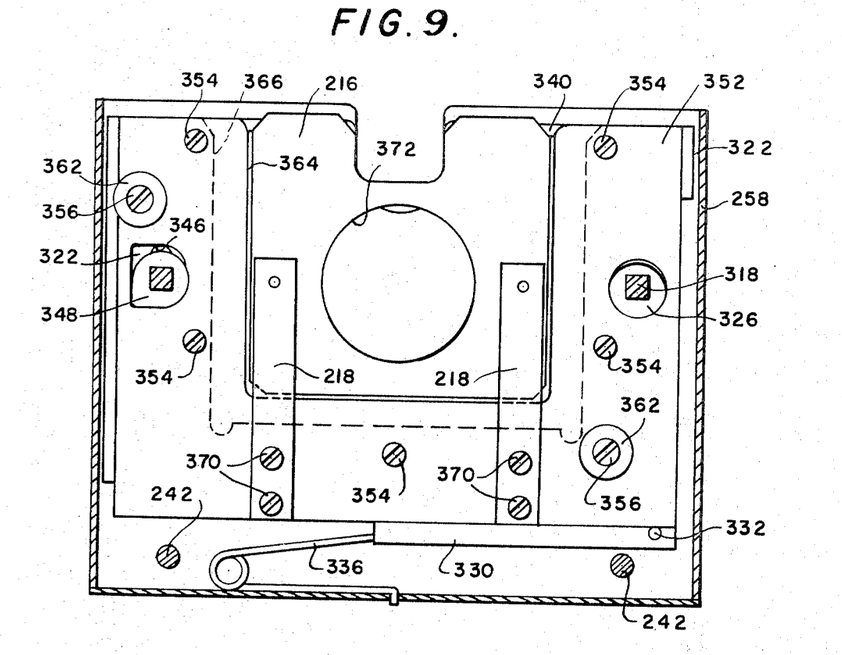
FIG. 9 is a sectional view taken along line 9—9 of FIG. 4.

Picture support plate 352 depicted in FIG. 9 is connected by bolts 354 to horizontal adjustment plate 340. Consequently, as horizontal adjustment plate 340 moves vertically with vertical adjustement plate 322 in response to rotation of control knob 210, picture support plate 352 likewise moves vertically and, as horizontal adjustment plate 340 moves horizontally in response to rotation of horizontal control knob 212, picture support plate 352 moves horizontally with it.

Picture support plate 352 is coupled to front plate 258 by bolts which fit within threaded openings on front plate 258. Lock nuts 357 secure this connection. Bolts 356 pass through enlarged openings in picture support plate 352, through enlarged openings 358 in horizontal adjustment plate 340 and through enlarged openings 360 in vertical adjustment plate 322. Washers 362 prevent the heads of bolts 356 from passing through the enlarged openings in picture support plate 352. Bolts 356 secure picture holder assembly 214 together for longitudinal movement as a unit with carriage 238 while permitting freedom of movement along the plane faces of plates 258, 322, 340 and 352. Consequently, minor adjustments in the vertical and horizontal alignment of picture 10 with picture holder assembly 214 can be made by means of control knobs 210 and 212.

A U-shaped aperture 364 is provided from the upper surface of picture support plate 352. The face of plate 352 adjacent horizontal adjustment plate 340 has a recess 366 surrounding the three sides of aperture 364. Pressure pad 216 fits within aperture 364. Springs 218 are attached to picture support plate 352 by bolts 370 and hold pressure pad 216 in place within aperture 364. A circular opening 372 is provided in the center of pressure pad 216. A picture thus can be slipped into picture support plate 352 fitting between pressure pad 216 and horizontal adjustment plate 340, and within recess 366. The viewing area of the picture is visible through opening 372. Springs 216 and pressure pad 216 cooperate to hold the picture firmly in place, and the picture moves with picture support plate 352 in response to rotation of control knobs 210 and 212 to achieve the desired vertical and horizontal alignment. Cam 326 is sandwiched between front plate 258 and horizontal adjustment plate 340. Likewise, cam 348 is sandwiched between vertical adjustment plate 322 and picture support plate 352. Thus, cams 326 and 348 move along rods 318 and 344, respectively, to stay aligned with vertical adjustment plate 322 and horizontal adjustment plate 340, respectively, as carriage 238 moves longitudinally within viewer 202.

Figure 10:
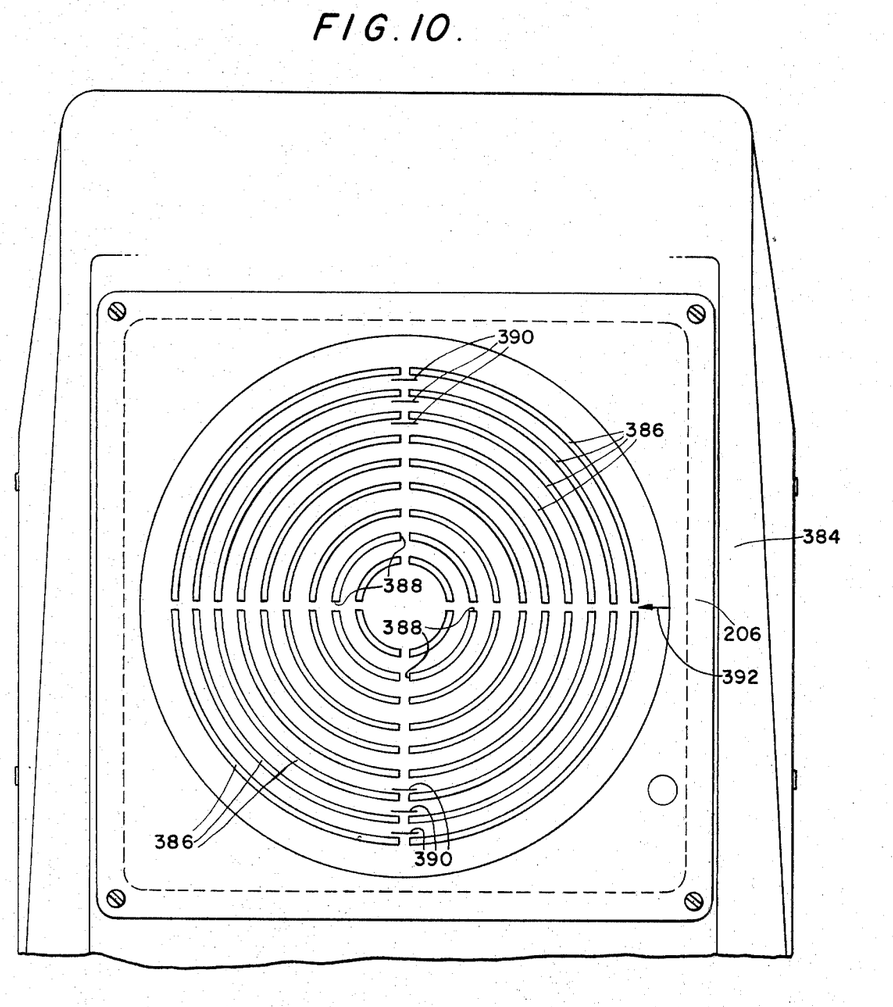
FIG. 10 is an enlarged fragmentary plan view of a portion of the viewer of FIG. 3.

Mirror support 380 is connected to the base of viewer 202 and supports mirror 382 at the angle required to reflect the image of a picture 10 in picture holder assembly 214 onto viewing screen 206. Lens assembly 220 and mirrow 382 thus define an optical path between picture holder 214 and viewing screen 206, with the magnification of the image formed on viewing screen 206 of a picture within picture holder 214, determined by the longitudinal position of carriage 238 within housing 255 of viewer 202. FIG. 10 depicts viewing screen 206 which is attached to top cover 384 of viewer 202. Viewing screen 206 includes a plurality of concentric circles 386 of varying diameters. The circles 386 are coordinated with the circles 14 projected onto cornea 13 so that the diameters of the circles 386 are related to the diameters of circles 14 on picture 10. Preferably, the circles 386 are not complete, but instead have breaks 388, for example at intervals of 90° or 180° to aid in determining when the circles 14 on the image of a picture 10 are coincident with circles 386. At a point ten percent of the distance from outermost circle 386 toward the next circle 386 is a short mark 390. Similar marks 390 can be placed inside the other circles 386 at points ten percent of the distance to the next circle 386, if desired.

The doctor or other operator places a picture 10 into picture holder assembly 214. Control knobs 210 and 212 are then adjusted as necessary to cause the image on viewing screen 206 of the circles 14 on the picture to be centered about the same point as are circles 386. Control knob 208 is then rotated to adjust the magnification of the picture image on viewing screen 206 to cause the circles 14 in that image to coincide as nearly as possible with circles 386. When this is achieved, the doctor reads the indicium 291 adjacent viewing aperture 298. This indicium 291 indicates the base curve, giving the radius of curvature of cornea 13. The doctor then rotates control knob 208 to demagnify the image on viewing screen 206 until the inner edge of the outermost circle 14 on that image is aligned with the adjacent mark 390 on viewing screen 206. He then reads the indicium 291 adjacent viewing aperture 298. This indicium 291 indicates the radius of curvature for the optical zone, so that a clearance in the order of approximately 0.05 millimeter is provided between the contact lens and the eyeball pupil, thus assuring comfort.

Frequently, the doctor wishes the contact lens to have a diameter equal to the radius of curvature of the cornea, and if so the base curve measurement indicates that diameter. If it is desired to provide a lens with a diameter slightly less than the cornea radius, the doctor adjusts control 208 to magnify the image of picture 10 on viewing screen 206 until the second outermost circle 14 coincides with the outer ring 386. Arrow 392 serves as a reminder of the ring 386 to be utilized for this purpose. The indicium 291 adjacent viewing aperture 298 then indicates the desired diameter. The base curve, optical zone and lens diameter are then utilized by the doctor in writing the prescription for the contact lenses.

Preferably, a light source 394 is provided beneath viewing aperture 298 to aid in reading the indicia 291. Rather than being constantly energized, light source 394 can be controlled by pushbutton 396 on viewer 202. If desired to remind the doctor or other operator of the measurement being read, one pushbutton 396 can be provided to energize light source 394 when the base curve measurement is being read, and a second pushbutton 398 provided to energize light source 394 when the optical zone is being read.

Although the present invention has been described with reference to a preferred embodiment, numerous modifications and rearrangements could be made, and still the result would be within the scope of the invention.

What is claimed is:

1. Apparatus usable in conjunction with a positive print of an eye cornea having superimposed thereon a circle with a diameter equal to the cornea radius of curvature for permitting the determination of the radius of curvature required of a contact lens to fit the cornea, said apparatus comprising:
 a housing;
 a picture holder adapted to hold the positive print;
 carriage means longitudinally movable within said housing for mounting said picture holder within said housing;
 first control means for controlling longitudinal movement of said carriage means within said housing;
 a viewing screen mounted on said housing and having thereon a circle of known diameter;
 optical means defining an optical path between said picture holder and said viewing screen, whereby when a positive print is within said picture holder, an image of that positive print is projected on said viewing screen at a magnification determined by the longitudinal position of said carriage means within said housing; and
 indicating means coupled to said housing and said carriage means for indicating the longitudinal position of said carriage means within said housing, said indicating means having thereon a plurality of indicia coordinated with the circle on said viewing screen, whereby when an image is projected on said viewing screen from said picture holder of a positive print of an eye cornea having superimposed thereon a circle of a diameter equal to the radius of curvature of the eye cornea and coordinated with the diameter of the circle on said viewing screen and said carriage means is adjusted longitudinally within said housing to cause the circle image to coincide with the circle on said viewing screen, the indicia of said indicating means indicate the radius of curvature of the eye cornea shown on the positive print.

2. Apparatus as claimed in claim 1 in which:
said carriage means comprises a pair of bars extending longitudinally within said housing and a frame mounted on said bars for longitudinal movement therealong; and
said first control means comprises a control knob, a sheave, and a control cable wound on said sheave and connected to said carriage means for moving said carriage means longitudinally on said bars in response to rotation of said control knob.

3. Apparatus as claimed in claim 1 in which said optical means includes:
a light source adjacent said picture holder;
a lens assembly mounted on said carriage means;
a mirror within said housing to reflect onto said viewing screen images applied to said mirror from said lens assembly; and
further control means responsive to longitudinal movement of said carriage means within said housing for moving said lens assembly with respect to said carriage means to maintain images on said viewing screen in the proper focus.

4. Apparatus usable in conjunction with a positive print of an eye cornea having superimposed thereon a circle with a diameter equal to the cornea radius of curvature for permitting the determination of the radius of curvature required of a contact lens to fit the cornea, said apparatus comprising:
a housing;
a viewing screen mounted on said housing and having thereon a circle of known diameter;
a picture holder adapted to hold the positive print;
carriage means longitudinally movable within said housing for mounting said picture holder within said housing;
first control means for controlling longitudinal movement of said carriage means within said housing;
optical means defining an optical path between said picture holder and said viewing screen, whereby when positive print is within said picture holder, an image of that positive print is projected on said viewing screen at a magnification determined by the longitudinal position of said carriage means within said housing;
said picture holder including means for adjusting the vertical and horizontal positioning of the image on said viewing screen; and
indicating means coupled to said housing and said carriage means for indicating the longitudinal position of said carriage means within said housing, said indicating means having thereon a plurality of indicia coordinated with the circle on said viewing screen, whereby when an image is projected on said viewing screen from said picture holder of a positive print of an eye cornea having superimposed thereon a circle of a diameter equal to the radius of curvature of the eye cornea and coordinated with the diameter of the circle on said viewing screen and said carriage means is adjusted longitudinally within said housing to cause the circle image to coincide with the circle on said viewing screen, the indicia of said indicating means indicate the radius of curvature of the eye cornea shown on the positive print.

5. Apparatus as claimed in claim 4 in which said picture holder comprises:
a first plate;
first mounting means for mounting said first plate on said carriage means while permitting limited vertical movement therebetween;
second control means for moving said first plate vertically with respect to said housing;
a second plate;
second mounting means for mounting said second plate on said first plate while permitting limited horizontal movement therebetween;
third control means for moving said second plate horizontally with respect to said housing;
a third plate for mounting a positive print adjacent said optical means; and
third mounting means for mounting said third plate on said second plate.

6. Apparatus as claimed in claim 4 in which said carriage means comprises a pair of bars extending longitudinally within said housing and a frame mounted on said bars for longitudinal movement therealong; and
said first control means comprises a control knob, a sheave, and a control cable wound on said sheave and connected to said carriage means for moving said carriage means longitudinally on said bars in response to rotation of said control knob.

7. Apparatus as claimed in claim 4 in which said optical means includes:
a light source adjacent said picture holder;
a lens assembly mounted on said carriage means;
a mirror within said housing to reflect onto said viewing screen images applied to said mirror from said lens assembly; and
further control means responsive to longitudinal movement of said carriage means within said housing for moving said lens assembly with respect to said carriage means to maintain images on said viewing screen in the proper focus.

8. Apparatus as claimed in claim 7 in which said further control means comprises a cam surface mounted on said housing; a lever pivotally mounted on said carriage means and having a first end in engagement with said lens assembly; and a roller rotatably mounted on the second end of said lever to roll on said cam surface as said carriage means moves longitudinally within said housing, whereby as said carriage means moves longitudinally within said housing, said lever second end is cammed by said cam surface to move said lever first end and thus said lens assembly with respect to said picture holder so that when a positive print is within said picture holder proper focus is maintained of the image of the positive print on said viewing screen.

9. Apparatus usable in conjunction with a positive print of an eye cornea having superimposed thereon a circle with a diameter equal to the cornea radius of curvature for permitting the determination of the radius of curvature required of a contact lens to fit the cornea, said apparatus comprising:
- a housing;
- a picture holder adapted to hold the positive print;
- carriage means longitudinally movable within said housing for mounting said picture holder within said housing;
- first control means for controlling longitudinal movement of said carriage means within said housing;
- a viewing screen mounted on said housing and having thereon a circle of known diameter;
- optical means defining an optical path between said picture holder and said viewing screen and including a light source adjacent said picture holder, a lens assembly mounted on said carriage means, a mirror within said housing to reflect onto said viewing screen images applied to said mirror from said lens assembly, a cam surface mounted on said housing, a lever pivotally mounted on said carriage means and having a first end in engagement with said lens assembly, and a roller rotatably mounted on the second end of said lever to roll on said cam surface as said carriage means moves longitudinally within said housing, whereby as said carriage means moves longitudinally within said housing, said lever second end is cammed by said cam surface to move said lever first end and thus said lens assembly with respect to said picture holder so that when a positive print is within said picture holder proper focus is maintained of the image of the positive print on said viewing screen at a magnification determined by the longitudinal position of said carriage means within said housing; and
- indicating means coupled to said housing and said carriage means for indicating the longitudinal position of said carriage means within said housing, said indicating means having thereon a plurality of indicia coordinated with the circle on said viewing screen, whereby when an image is projected on said viewing screen from said picture holder of a positive print of an eye cornea having superimposed thereon a circle of a diameter equal to the radius of curvature of the eye cornea and coordinated with the diameter of the circle on said viewing screen and said carriage means is adjusted longitudinally within said housing to cause the circle image to coincide with the circle on said viewing screen, the indicia of said indicating means indicate the radius of curvature of the eye cornea shown on the positive print.

10. Apparatus usable in conjunction with a positive print of an eye cornea having superimposed thereon a circle with a diameter equal to the cornea radius of curvature for permitting the determination of the radius of curvature required of a contact lens to fit the cornea, said apparatus comprising:
- a housing;
- a picture holder adapted to hold the positive print;
- carriage means longitudinally movable within said housing for mounting said picture holder within said housing;
- first control means for controlling longitudinal movement of said carriage means within said housing;
- a viewing screen mounted on said housing and having thereon a circle of known diameter;
- optical means defining an optical path between said picture holder and said viewing screen, whereby when positive print is within said picture holder, an image of that positive print is projected on said viewing screen at a magnification determined by the longitudinal position of said carriage means within said housing; and
- indicating means coupled to said housing and said carriage means for indicating the longitudinal position of said carriage means within said housing, said indicating means including a reel, a tape having thereon said plurality of indicia coordinated with the circle on said viewing screen and having a first end connected to said reel and a second connected to said carriage means, biasing means for urging said reel to rotate to draw said tape onto said reel, means defining a viewing aperture, and guide means intermediate said reel and said carriage means for guiding said tape from said reel, across the viewing aperture, to said carriage means, whereby when a image is projected on said viewing screen from said picture holder of a positive print of an eye cornea having superimposed thereon a circle of a diameter equal to the radius of curvature of the eye cornea and coordinated with the diameter of the circle on said viewing screen and said carriage means is adjusted longitudinally within said housing to cause the circle image to coincide with the circle on said viewing screen, the indicia of said indicating means indicate the radius of curvature of the eye cornea shown on the positive print.

11. Apparatus as claimed in claim 10 in which said guide means includes a bell crank pivotally mounted on said carriage means; a first guide wheel rotatably mounted on the first end of said bell crank; a roller rotatably mounted on the second end of said bell crank to roll on said inclined member as said carriage moves within said housing; and at least one additional guide wheel mounted on said housing, said guide wheels defining the path of said tape from said reel to said carriage means.

12. Apparatus as claimed in claim 11 in which said guide means further includes means adjustably mounting said inclined member on said housing to permit adjustment of the inclination thereof.

13. Apparatus as claimed in claim 11 in which said guide wheels define a path including three passes of said tape between said reel and said carriage means.

* * * * *

UNITED STATES PATENT OFFICE
CERTIFICATE OF CORRECTION

Patent No. 3,804,528          Dated April 16, 1974

Inventor(s) Lauren G. Kilmer; McCabe C. Lively

It is certified that error appears in the above-identified patent and that said Letters Patent are hereby corrected as shown below:

In the paragraph designating inventors' names and company affiliations, "Gemco" should read --Temco--;

Column 2, line 38, "depicited" should read --depicted--;

Column 4, line 46, "cable" should read --Cable--;

Column 5, line 64, "correspondingly" should read --corresponding--;

Column 6, line 6, "PIns" should read --Pins--;

Column 6, line 39, "openings" should read --opening--;

Column 6, line 57, "bolts which" should read --bolts 356 which--;

Column 7, line 18, "Springs 216" should read --Springs 218--;

Column 7, line 35, "mirrow" should read --mirror--.

Signed and sealed this 24th day of September 1974.

(SEAL)
Attest:

McCOY M. GIBSON JR.
Attesting Officer

C. MARSHALL DANN
Commissioner of Patents